US009062617B2

(12) United States Patent
Mauti, Jr.

(10) Patent No.: US 9,062,617 B2
(45) Date of Patent: Jun. 23, 2015

(54) AUTOSTARTING A VEHICLE BASED ON USER CRITERIA

(71) Applicant: General Motors LLC, Detroit, MI (US)

(72) Inventor: Thomas K. Mauti, Jr., Lake Orion, MI (US)

(73) Assignee: General Motors LLC, Detroti, MI (US)

( * ) Notice: Subject to any disclaimer, the term of this patent is extended or adjusted under 35 U.S.C. 154(b) by 0 days.

(21) Appl. No.: 13/742,652

(22) Filed: Jan. 16, 2013

(65) Prior Publication Data

US 2014/0200742 A1 Jul. 17, 2014

(51) Int. Cl.
*G06F 7/00* (2006.01)
*F02D 29/02* (2006.01)
*F02N 11/08* (2006.01)

(52) U.S. Cl.
CPC ............ *F02D 29/02* (2013.01); *F02N 11/0807* (2013.01); *F02N 2200/123* (2013.01)

(58) Field of Classification Search
USPC ........................................................ 701/2, 36
See application file for complete search history.

(56) References Cited

U.S. PATENT DOCUMENTS

| | | | | |
|---|---|---|---|---|
| 2005/0030156 | A1* | 2/2005 | Alfonso et al. | 340/5.61 |
| 2009/0047022 | A1* | 2/2009 | Newman et al. | 398/106 |
| 2010/0235046 | A1* | 9/2010 | Proefke et al. | 701/36 |
| 2011/0074561 | A1* | 3/2011 | Mackjust et al. | 340/426.13 |
| 2011/0256904 | A1* | 10/2011 | Simmons | 455/556.1 |
| 2013/0061621 | A1* | 3/2013 | Nielsen | 62/236 |
| 2013/0151132 | A1* | 6/2013 | Harumoto et al. | 701/113 |

* cited by examiner

*Primary Examiner* — Hussein A. Elchanti
(74) *Attorney, Agent, or Firm* — Anothony Luke Simon; Reising Ethington P.C.

(57) ABSTRACT

A method of remotely performing a vehicle autostart function when starting a vehicle engine. A vehicle may be associated with a handheld communication device (HCD) using a vehicle mobile application (e.g., on the HCD). Using the application, a configuration of at least one vehicle function and autostart criteria may be received. The auto-start criteria may define a geographic area. It may be determined that the vehicle and the HCD are located within the geographic area at a time when it is desirable to autostart the vehicle. Weather data may be determined for the geographic area at that time. The vehicle's engine may be autostarted and at least one vehicle autostart function may be performed.

20 Claims, 5 Drawing Sheets

AUTOSTARTING A VEHICLE BASED ON USER CRITERIA

TECHNICAL FIELD

The present invention relates generally to autostarting a vehicle and, more particularly, to autostarting a vehicle based upon the proximity of a personal mobile device and also performing a vehicle function associated with the vehicle engine start.

BACKGROUND OF THE INVENTION

Some vehicles provide a user with the ability to remotely activate a vehicle engine using a vehicle keyfob. Typically, when the vehicle is started, any vehicle climate control settings such as heat and air conditioning remain in the same state as when the vehicle engine was last ON. The same is true for the associated fan level or blower motor level (i.e., to blow heated or cooled air). At the time of the next vehicle start, such settings may not be desirable. For example, the vehicle heater may be blowing because it was cold in the morning (when a user arrived at work) despite the fact that it is now warm in the afternoon (when the user departs from work).

SUMMARY OF THE INVENTION

According to an aspect of the invention, there is provided a method of remotely performing a vehicle autostart function when starting a vehicle. The method may include receiving two or more geo-boundary parameters and a time-session parameter, wherein the parameters are associated with autostarting a vehicle. It may also include determining that the vehicle and a handheld communication device (HCD) associated with the vehicle are within a geographic area defined by the geo-boundary parameters at a time defined by the time-session parameter. It may further include remotely autostarting the vehicle's engine. And it may also include performing at least one vehicle autostart function as a result of the determination.

In accordance with another aspect of the invention, there is provided a method of configuring auto-start criteria of a vehicle using a handheld communication device (HCD) The method may include providing a vehicle mobile application (VMA) for associating a vehicle with an HCD. It may further include receiving via the VMA a configuration of auto-start criteria associated with a remote auto-start of the vehicle, wherein the auto-start criteria includes two or more geo-boundary parameters and at least one time-session parameter. And it may also include receiving via the VMA a configuration of one or more vehicle autostart functions to be applied at the time vehicle is remotely started when both the vehicle and the HCD are within a geographic area defined by the geo-boundary parameters at a time defined by the at least one time-session parameter.

In accordance with another aspect of the invention, there is provided a method of remotely performing a vehicle autostart function when starting a vehicle engine. The method includes associating a vehicle with a handheld communication device (HCD) using a vehicle mobile application, wherein the application is available via the HCD. It may also include receiving a configuration of at least one vehicle function via the application. It may further include receiving auto-start criteria for the vehicle via the application, wherein the auto-start criteria includes two or more geo-boundary parameters and at least one time-session parameter. It may further include determining that the vehicle and the HCD are located within a geographic area defined by the geo-boundary parameters at a time defined by the at least one time-session parameter. It may further include determining weather data of the geographic area at the time defined by the at least one time-session parameter. It also may include auto-starting the vehicle's engine, and performing at least one vehicle autostart function as a result of both determining steps.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to remotely starting a vehicle when the vehicle and a personal mobile device associated with the vehicle are within a predetermined geographic area at a predetermined time or within a predetermined time range. In addition, a vehicle autostart function (i.e., a function associated with starting a vehicle) may be performed at or near the time of the remote start. Also, a method is described to configure criteria associated with remotely starting the vehicle. The criteria may include one or more of the following: defining the geographic area; defining the time or time range associated with autostarting the vehicle in the geographic area; defining the vehicle autostart functions; and associating the personal mobile device with the vehicle.

Communications System

Figure 1:
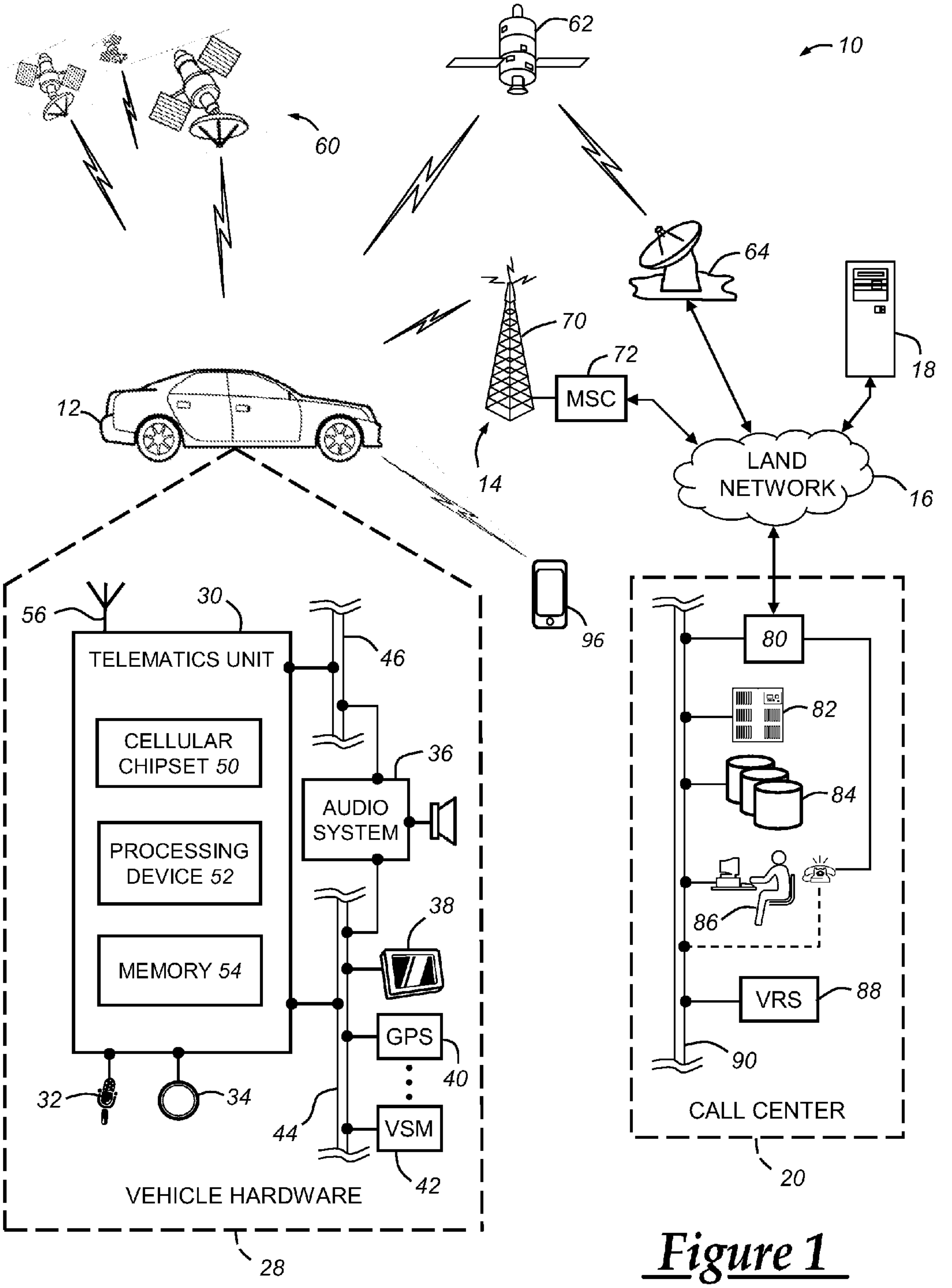
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle.

Other examples of VSMs may include modules to control or regulate window glass defrosters, window glass defoggers, window glass wiper fluid sprayer nozzles (e.g., for cleaning and/or deicing the glass), external lighting defrosters, external lighting defoggers, external lighting wiper fluid sprayer nozzles, external lighting wipers, cabin climate control devices such as heating/cooling devices and their associated controls (e.g., temperature settings, fans, air movers, blowers, etc.) and sensors (e.g., cabin air temperature sensor, steering wheel temperature, seat temperature, etc.)—such devices may control the ambient cabin air temperature, the steering wheel temperature, and one or more vehicle seat temperatures. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Examples of call center back-end functions may include obtaining and/or storing weather data. The weather data may be associated with a predetermined geographic area (e.g., a street address or a radius about a geographic point or position having latitude and longitude elements or coordinates) or a predetermined geographic region (e.g., a group of geographic areas, a city block, a town, city, a county, etc.). In some instances, the weather data may be received in real-time. As used herein, the term weather data includes any information or data concerning the state of the atmosphere such as: temperature, wind speed and direction, precipitation (e.g., type, volume, rate, etc.), barometric pressure, sky conditions (cloud cover, percent overcast, type, etc.), humidity, dew point, sunrise/sunset times, etc.).

The personal mobile device or handheld communication device (HCD) 96 may be an electronic device which may be used to make mobile telephone calls across a wide geographic area where transmissions are facilitated by the wireless communication system 16. The HCD may include: hardware, software, and/or firmware enabling cellular telecommunications and communications via short-range wireless communication (e.g., Wi-Fi Direct and Bluetooth) as well as other HCD applications. Such HCD applications may include software applications, which may be preinstalled or installed by the user and/or via a graphical user interface (GUI) to control the hardware device using firmware and/or software. For example, a vehicle mobile application (VMA) software may allow a vehicle user to send and receive information and/or commands between the vehicle 12 and the HCD. One commercial embodiment of such software is OnStar's RemoteLink™. The hardware of the HCD 96 may comprise: a display, a keypad (e.g., push button and/or touch screen), a microphone, one or more speakers, motion-detection sensors (such as accelerometers, gyroscopes, etc.), a GPS component, and a camera. In addition to the aforementioned features, modern HCDs may support additional services and/or functionality such as short messaging service (SMS or texts), multimedia messaging service (MMS), email, internet access, short-range wireless communications (e.g., Bluetooth or Wi-Fi Direct), as well as business and gaming applications. Non-limiting examples of the HCD 96 include a cellular telephone, a personal digital assistant (PDA), a Smart Phone, a personal laptop computer having two-way communication capabilities, a netbook computer, or combinations thereof. The HCD 96 may be used inside or outside of a mobile vehicle (such as the vehicle 12 shown in FIG. 1), and may be configured to provide services according to a subscription agreement with a third-party facility.

The HCD 96 may be capable of identifying its geographic location or position. For example, the HCD may use the GPS component. The HCD may also identify its geographic position by other means; e.g., assisted GPS (known to skilled artisans), synthetic GPS (known to skilled artisans), cellular ID (associating the geographic location with a cell tower being used by the HCD), Wi-Fi (associating the geographic location with the location of one or more Wi-Fi networks being used by the HCD), inertial sensors (e.g., tracking the HCD's geographic location using a compass or magnetometer, an accelerometer, and a gyroscope), barometric sensors (e.g. determining elevation, for example in a building), ultrasonic sensors (e.g., RFID), short range wireless communication beacons (associating a geographic location with the location of one or more Bluetooth or Wi-Fi direct devices, e.g., in a retail store), terrestrial transmitters (e.g. terrestrial GPS devices such as Locata™), etc.

The HCD 96 and the vehicle 12 may be used together by a person known as the vehicle user. The vehicle user can be but does not need to be the driver of the vehicle 12 nor does the vehicle user need to have ownership of the HCD 96 or the vehicle 12 (e.g., the vehicle user may be an owner or a licensee of either or both).

Method

Figure 2:
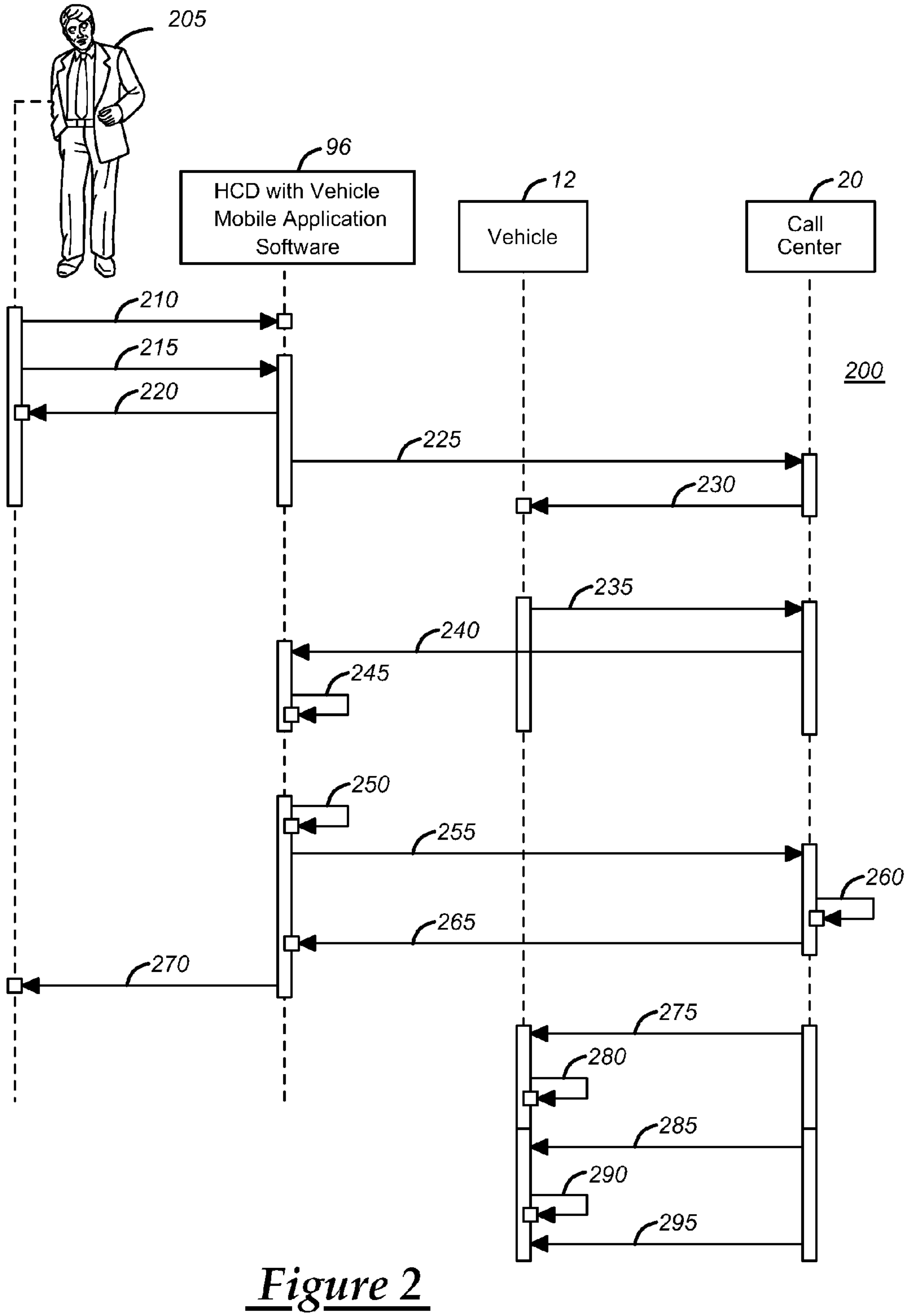
FIG. 2 is a flow diagram depicting an exemplary embodiment of remote starting a vehicle and performing an associated vehicle autostart function.

Turning now to FIG. 2, there is shown a flow diagram 200 illustrating one implementation of a configuration and execution of a remote start or autostart of vehicle 12 and the performance of at least one vehicle autostart function (e.g., a comfort or climate control setting). The configuration includes setting geo-boundary and time-session parameters using HCD 96 and may further include electing or otherwise choosing user-preferences with respect to the autostart function(s). The following flow diagram 200 is merely exemplary; other implementations are also possible.

The flow diagram begins with a user 205 registering or enrolling the user's vehicle 12 using the VMA software [step 210] preinstalled or installed on the HCD 96. This step also may associate the vehicle and the HCD with one another (e.g., via a third party authorizer—e.g., the call center 20). The registration may include electing, defining, or otherwise choosing one or more vehicle autostart functions to be performed at the time the vehicle is auto started. Examples of the vehicle autostart functions may include: heating or cooling the vehicle cabin temperature (i.e., the ambient cabin temperature); heating or cooling one or more vehicle seats; heating or cooling the vehicle steering wheel; defrosting or defogging one or more vehicle windows or window-glasses; operating one or more window-glass wipers; deicing one or more vehicle windows; defrosting or deicing one or more side mirror assemblies; defrosting or deicing one or more external lighting components (e.g., vehicle headlamps); operating one or more external lighting component wipers (e.g., headlamp wipers); etc.

The registration using the VMA software may also include electing, defining, or otherwise choosing two or more geo-boundary parameters and at least one time session parameter [step 215]. As used herein, the term geo-boundary parameter refers to any determinable or measurable geographic identifier. Examples of geo-boundary parameters include landmarks, natural and artificial structures (including paved and non-paved parking lots and driveways), crossroads, a geographical latitude (or a latitude element), a geographical longitude (or a longitude element), a geographical point (e.g., both latitude and longitude elements or coordinates), and radiuses measured from any geographical point. As used herein, the term time-session parameter refers to any determinable or measurable time identifier (e.g., a specific time, a start time, an end time, a duration, etc.). A specific time may include a precise time on a precise day. Or multiple time-session parameters may include precise times on a specific day(s) or on one or more predetermined days of the week, such as Monday through Friday. Other multiple time-session parameters may include a specific range of time having a start time and an end or stop time (and may be inclusive of the duration therebetween, i.e., a range of time). The time range may also be on a specific day(s) or on one or more predetermined days of the week. The time-session parameter may include instances where a specific time or specific range recurs week after week. In some instances, it may also intelligently exclude days or times from the time-session parameter—for example, days that are predetermined to be holidays, weekends, or vacation time.

At step 220, the VMA software may display the predetermined autostart criteria (e.g., the geo-boundary parameters and the time session parameter(s)) to the user via the display on the HCD 96. This may occur after all the autostart criteria has been entered and/or while the autostart criteria is being entered. For example, the VMA software may include an interactive map enabling the user to choose one or more geographical points to define the geographic area—the user may or may not be required to identify or otherwise input latitude and longitude elements; e.g., if the HCD has a touch screen, the user may touch/tap the location of each geographic point on the displayed map. In one embodiment, once at least three nonlinear geographic points have been selected, the application may shade, highlight, or identify the area defined by the linear segments interconnecting the points as the geographic area (i.e., the area within which the vehicle may be remotely autostarted). And the user may select additional points and further define the geographic area. After points have been selected, it may be possible to expand or contract the geographic area on the interactive map by rearranging or redefining the geographic points previously selected (e.g., by dragging the points on a touch screen). In another embodiment, once one geographic point has been selected, the user may define a radius thereabout—the geographic area being a circle. In another embodiment, once two or more geographic points have been selected, the user may define radii thereabout each selected point—the geographic area being an area of one or more circles (which may or may not overlap); in at least one embodiment, this may be a geometrically-enclosed curve. Furthermore, nothing prevents the user from defining a geographic area using a combination linear segments and radii. Also, the user may define a plurality of geographic areas: a first geographic area, a second geographic area, a third geographic area, etc. Each geographic area may have one or more associated time session parameters.

Once the user 205 has registered his/her vehicle 12 and has configured or defined the autostart criteria, the HCD 96 may communicate this to the call center 20 (e.g., via the wireless carrier 14) [step 225]. The call center may then configure the telematics unit 30 in the vehicle 12 [step 230]. Configuring the telematics unit may enable the unit 30 to determine whether the vehicle 12 is within the geo-boundary parameters previously defined by the user. The telematics unit may perform the logic functions necessary to make this determination based at least in part on information received from the GPS module 40. In another implementation of step 230, the configuration of the telematics unit may enable the telematics unit to report its geographic location or position to the call center 20 so the call center may determine whether the vehicle 12 is within the geo-boundary parameters previously defined by the user. In some implementations, the configuration of the telematics unit may also include providing, instructing, or otherwise commanding the telematics unit to perform one or more vehicle functions (e.g., functions either defined by the user (e.g., at the time of registration or later) or default functions (e.g., defined by the manufacturer or other suitable entity)).

Once these preliminary steps [210-230] have been accomplished, the first autostart opportunity may arise when the vehicle 12 enters the geographic area defined by the geo-boundary parameters [step 235]. The call center 20 may then notify or otherwise communicate to the HCD 96 that the vehicle 12 is within the geo-boundary parameters [step 240]. This notification may or may not be displayed to the user via the HCD. The HCD then may monitor or otherwise determine its geographic position at the time of the time-session parameter (or e.g., in the case of multiple time-session parameters, during a time range defined by a plurality of time-session parameters) [step 245]. A presumption of the operation of this method may be that the user 205 is with the HCD 96 (or carrying the HCD).

The HCD may identify an autostart event [step 250] when the HCD enters the geographic area defined by the geo-boundary parameters at the appropriate time (i.e., as defined by the time-session parameter(s)). Using the VMA software, the HCD then may notify the call center 20 of the occurrence of the autostart event [step 255]. The call center 20, using one or more of its back-end functions, then may obtain weather data for the geographic area [step 260] and thereafter may send a notification to the HCD that the vehicle 12 has been or is about to be autostarted [step 265]. The HCD may or may not display the notification of the vehicle autostart to the user [step 270].

At step 275, the call center 20 may wirelessly and remotely trigger an autostart of the vehicle 12 via the telematics unit. And the vehicle engine may start or begin to run [step 280]. In at least one embodiment, the call center 20 provides the weather data to the telematics unit following the autostart trigger [step 285]. This may occur before, after, or during the vehicle engine starting. When the telematics unit has received the weather data, it may determine which vehicle autostart functions are appropriate and then command or otherwise direct one or more VSMs to perform the functions [step 290].

In some embodiments, the vehicle autostart functions may not have been previously defined by the user (e.g., they may be default functions—defined by the vehicle manufacturer or other OEM). In such implementations, the call center may provide the weather data to the telematics unit which then may determine which vehicle autostart functions are appropriate, or the call center may determine which autostart functions are appropriate in view of the weather data and thereafter command the telematics unit [step 295].

Regardless of where (i.e., in the telematics unit or at the call center) the determination is made (i.e., which autostart functions are appropriate under the circumstances), it should be appreciated that many possible autostart functions are possible. A few here are listed here by way of example. For example, the ambient cabin temperature may be altered if the weather data indicates that the outside temperature for the geographic area or region varies more than 5° from 70° F. (also, in some vehicles the vehicle seat and/or steering wheel may be heated or cooled in similar circumstances). Or for example, the vehicle windshield or window glass may be deiced, defrosted, and/or defogged if the weather data indicates that the outside temperature for the geographic region is less than 35° F. (also, external lighting such as vehicle headlamps may also be deiced and/or defrosted under similar circumstances). Or for example, the vehicle windshield or window glass may be defrosted and window glass wipers may be actuated if the weather data indicates that the outside temperature for the geographic region is greater than 30° F. and precipitation is present in the region. As previously stated, other examples are also possible and various combinations of the above examples may also be possible.

Figure 3:
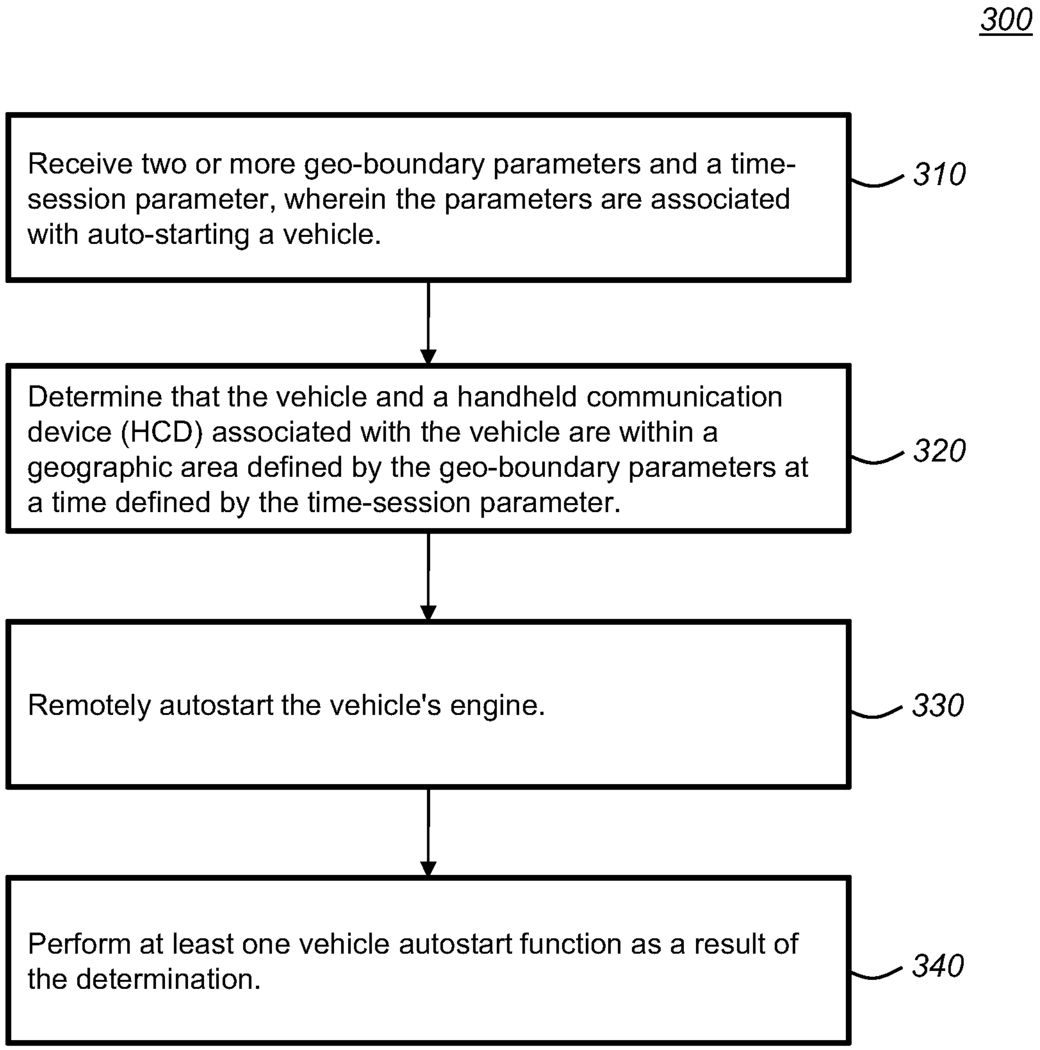
FIG. 3 is a flowchart of one exemplary method of the present disclosure.

Now turning to FIG. 3, the flowchart illustrates one exemplary method of remotely performing a vehicle autostart function when starting a vehicle [300]. The method begins at step 310 where two or more geo-boundary parameters and a time session parameter are received; and the time parameter is associated with auto-starting the vehicle 12. In at least one implementation, these parameters may be received by the call center 20 from the HCD (e.g., using the vehicle mobile application). At step 320, it is determined whether the vehicle and the HCD associated with the vehicle are within the geographic area defined by the geo-boundary parameters at the time defined by the time session parameter(s). As has been previously discussed, this step may be accomplished by various means—e.g., using the GPS module 40 within the vehicle and the GPS component within the HCD. Once it is determined that the vehicle is within the geographic area at the appropriate time (as defined by the time session parameter(s)), the vehicle engine may be remotely autostarted [step 330]. And after the engine is started, at least one vehicle autostart function may be performed as a result of the determination [step 340]. The various vehicle autostart functions have also previously been discussed and therefore will not be discussed again here or hereafter.

Figure 4:
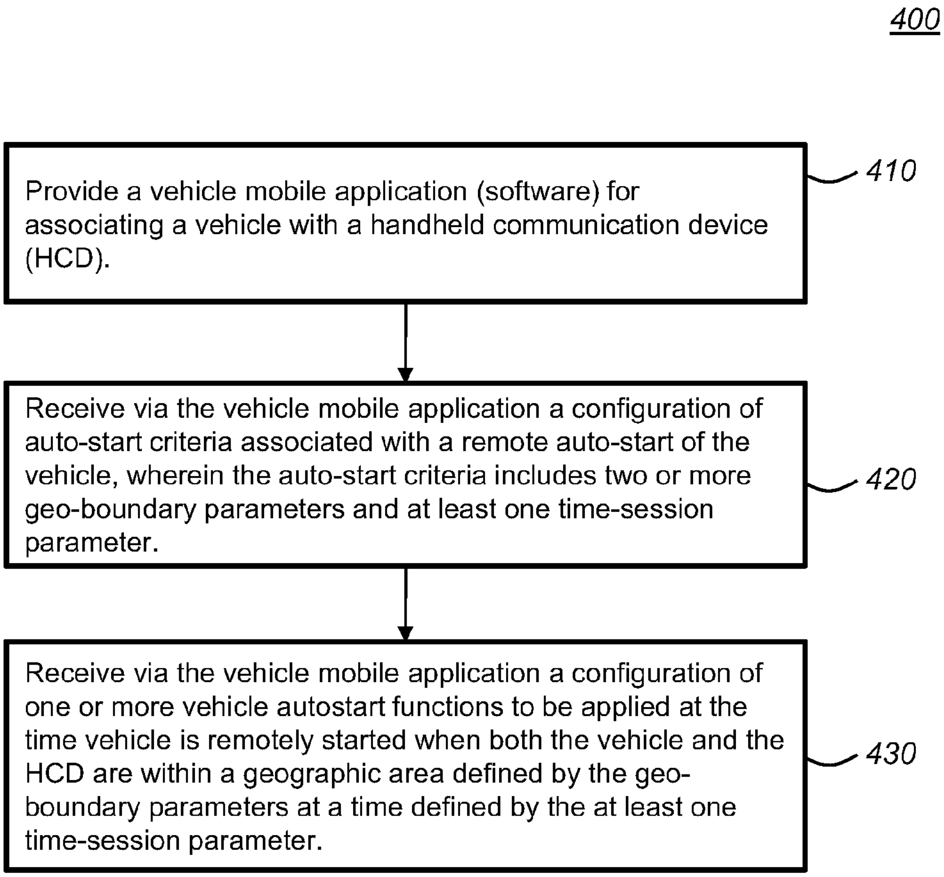
FIG. 4 is a flowchart of another exemplary method of the present disclosure.

Now turning to FIG. 4, the flowchart illustrates a method of configuring autostart criteria of the vehicle using the HCD [400]. The method begins at step 410 where a vehicle mobile application is provided for the HCD enabling the HCD to be associated with the vehicle. At step 420, a configuration of autostart criteria—which includes at least two or more geo-boundary parameters and one time session parameter—may be received via the vehicle mobile application (VMA) and the HCD. In at least one implementation, the autostart criteria may be received by the call center 20 from the HCD (e.g., using the vehicle mobile application). And at step 430, a configuration of one or more vehicle autostart functions may be received via the VMA software and the HCD; the autostart functions may be applied at the time the vehicle is remotely started when both the vehicle and the HCD are within a geographic area defined by the geo-boundary parameters at a time defined by at least one time-session parameter. (Receipt of this configuration may or may not be part of or in conjunction with the receipt of the autostart criteria in step 420.) In at least one implementation, this configuration may also be received by the call center (e.g., via the HCD and vehicle mobile application).

Figure 5:
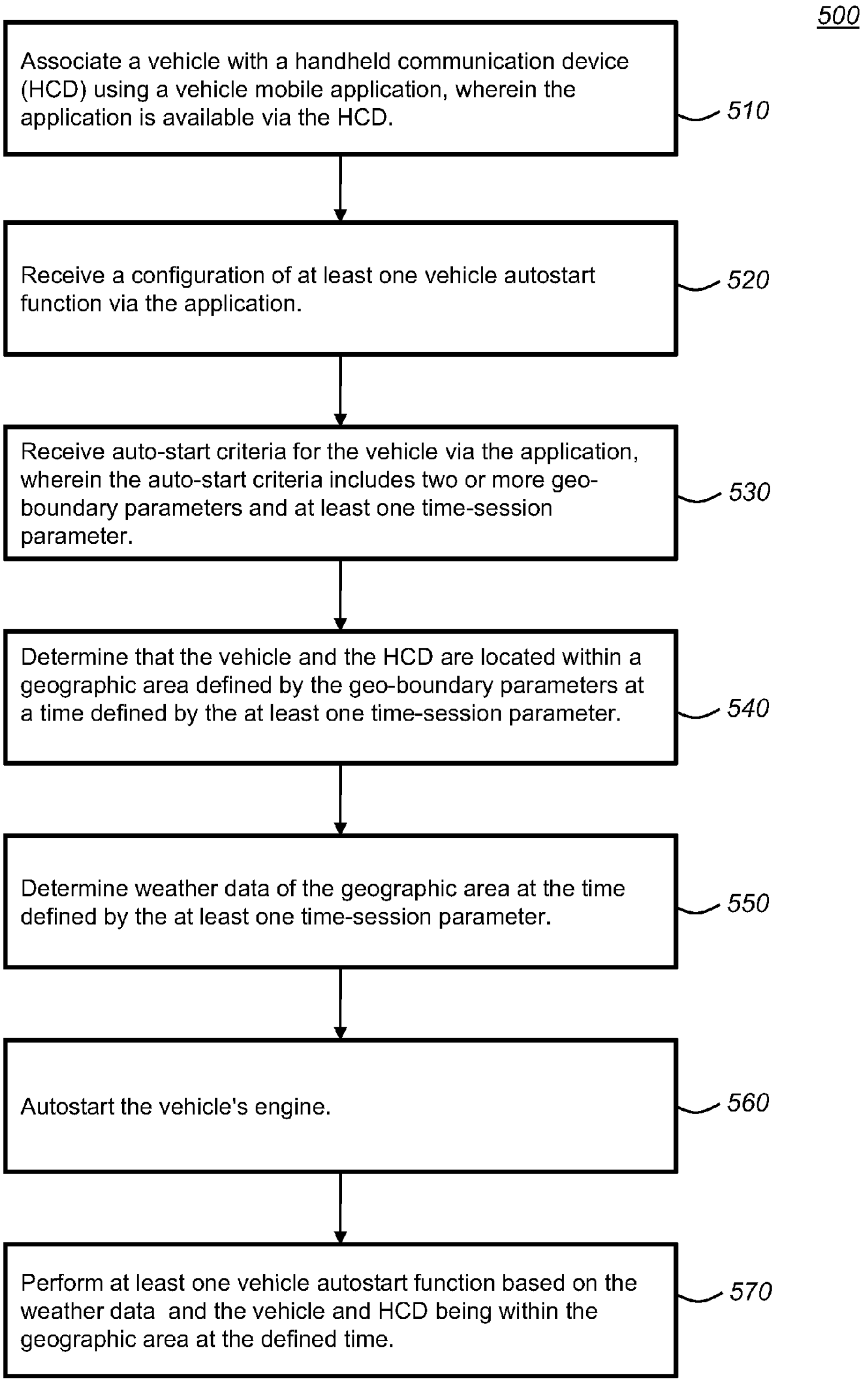
FIG. 5 is a flowchart of another exemplary method of the present disclosure.

Now turning FIG. 5, the flowchart illustrates a method of remotely performing a vehicle autostart function when starting a vehicle engine [500]. The method begins at step 510 where the vehicle 12 is associated with the HCD 96 using the VMA software on or available via the HCD. At step 520, a configuration of at least one vehicle autostart function is received using the application (e.g. received at the call center). At step 530, autostart criteria for the vehicle is received via or using the application (the criteria includes at least two or more geo-boundary parameters at least one time session parameter). At step 540, it is determined whether the vehicle and the HCD are located within the geographic area at the appropriate time (e.g., this determination may be made by the vehicle telematics unit or by the call center using the geo-boundary parameters at a time defined by at least one time-session parameter, as previously discussed). Once the vehicle and the HCD are within the geographic area at the appropriate time, weather data is received and/or determined (e.g., by the call center) for that geographic area at the appropriate time(s) (i.e., according to or as defined by the one or more time-session parameters) [step 550]. At step 560, the vehicle's engine is autostarted. This autostart may be a result of a trigger or other signal wirelessly sent by the call center to the vehicle telematics unit. And at step 570, at least one vehicle autostart function may be performed (e.g., the autostart function may be a default function or a user-defined or user-selected preference). The autostart function may be based on both steps 540 and 550.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of remotely performing a vehicle function when starting a vehicle, comprising the steps of:

receiving at a call center location parameters predefining a polygonal region where the vehicle is to be remotely and automatically started, wherein the location parameters are received wirelessly via a handheld communication device (HCD), and wherein the location parameters comprise a plurality of geographic points that define the polygonal region, wherein the plurality of geographic points are selected by a user of the HCD;

determining that the vehicle and the HCD are within the polygonal region in accordance with at least one time parameter predefined using the HCD; and transmitting a command to a telematics unit in the vehicle, wherein the command comprises a remote start command and a command to perform at least one additional vehicle function associated with remotely starting the vehicle.

2. The method of claim 1, wherein the polygonal region defines a geobox, wherein the geobox is an area circumscribed by three or more geographic points, wherein each of the points comprise a latitude element and a longitude element.

3. The method of claim 1, wherein the polygonal region defines a geometrically-enclosed curve, wherein the geometrically-enclosed curve comprises two or more radii measured from two or more geographic points, wherein each of the points comprise a latitude element and a longitude element.

4. The method of claim 1, wherein the plurality of geographic points define a circle.

5. The method of claim 1, wherein the at least one time parameter is a specific time during a 24-hour period.

6. The method of claim 1, wherein the at least one time parameter is a time range having a start time and an end time, inclusive of all the times therebetween.

7. The method of claim 1, wherein the at least one additional vehicle function to be performed is determined by the telematics unit or the call center.

8. The method of claim 7, further comprising the step of determining at the call center weather data for the polygonal region prior to the transmitting step.

9. The method of claim 8, wherein, when the telematics unit determines the at least one additional vehicle function, then transmitting the weather data from the call center to the telematics unit.

10. The method of claim 9, wherein the at least one additional vehicle function includes adjustment of one or more of the following: ambient cabin temperature, seat temperature, steering wheel temperature, window defroster, window defogger, window-glass wipers, window-glass de-icing, side-mirror defroster, external lighting defroster, external lighting wipers, and external lighting de-icing.

11. The method of claim 1, further comprising the step of sending a notification from the call center to the HCD that the vehicle has been remotely and automatically started.

12. A method of remotely performing a vehicle function when starting a vehicle engine, comprising the steps of:

wirelessly receiving from a handheld communication device (HCD) at a vehicle call center location parameters predefining a polygonal region where the vehicle is to be remotely and automatically started, wherein the location parameters comprise a plurality of geographic points that define the polygonal region, wherein the plurality of geographic points are selected by a user of the HCD;

transmitting the location parameters from the call center to a telematics unit in the vehicle;

wirelessly receiving at the call center an indication from the telematics unit that the vehicle has entered the polygonal region;

transmitting to the HCD from the call center a notification that the vehicle is within the polygonal region;

wirelessly receiving at the call center a response from the HCD that the HCD is within the polygonal region according to a predefined time parameter;

determining at the call center weather data of the polygonal region; and transmitting a command to a telematics unit in the vehicle, wherein the command comprises a remote start command and a command to perform at least one additional vehicle function associated with both remotely starting the vehicle and with the weather data determined at the call center.

13. The method of claim 12, wherein the polygonal region includes one of the following:

a geobox, wherein the geobox is an area circumscribed by three or more geographic points, wherein the points comprise a latitude element and a longitude element, or a geometrically-enclosed curve, wherein the geometrically-enclosed curve comprises two or more radii measured from two or more geographic points, wherein each of the points comprise a latitude element and a longitude element.

14. The method of claim 1, wherein the determining step further comprises: receiving at the call center a notification from the HCD that the HCD is within the polygonal region.

15. The method of claim 12, further comprising: prior to receiving the location parameters, receiving enrollment data at the call center that associates the vehicle with the HCD, wherein the HCD includes a mobile application configurable by a the user to define vehicle autostart parameters.

16. The method of claim 12, wherein at least one additional vehicle function includes adjusting vehicle parameters associated with one or more of the following: ambient cabin temperature, seat temperature, steering wheel temperature, window defroster, window defogger, window-glass wipers, window-glass de-icing, side-mirror defroster, external lighting defroster, external lighting wipers, and external lighting de-icing 17. The method of claim 12, wherein the determined weather data of the polygonal region is provided to the call center by the HCD.

18. The method of claim 12, wherein the predefined time parameter includes: a specific date and time, or a time range having a start time and an end time, inclusive of all the times therebetween.

19. The method of claim 12, wherein the time parameter is predefined by the user prior to receiving the notification.

20. A method of remotely performing a vehicle function associated with remotely starting an engine of a vehicle, comprising the steps of:

receiving at a call center location parameters predefining a polygonal region where the vehicle is to be remotely and automatically started, wherein the location parameters are received wirelessly via a handheld communication device (HCD), wherein the location parameters comprise one or more linear segments that define the polygonal region, wherein at least one of the linear segments is straight, wherein the one or more linear segments are selected by a user of the HCD;

determining that the vehicle and the HCD are within the polygonal region in accordance with at least one time parameter predefined using the HCD; and transmitting a command to a telematics unit in the vehicle, wherein the command comprises a remote start command and a command to perform at least one additional vehicle function associated with remotely starting the vehicle.

* * * * *